Figure 1:
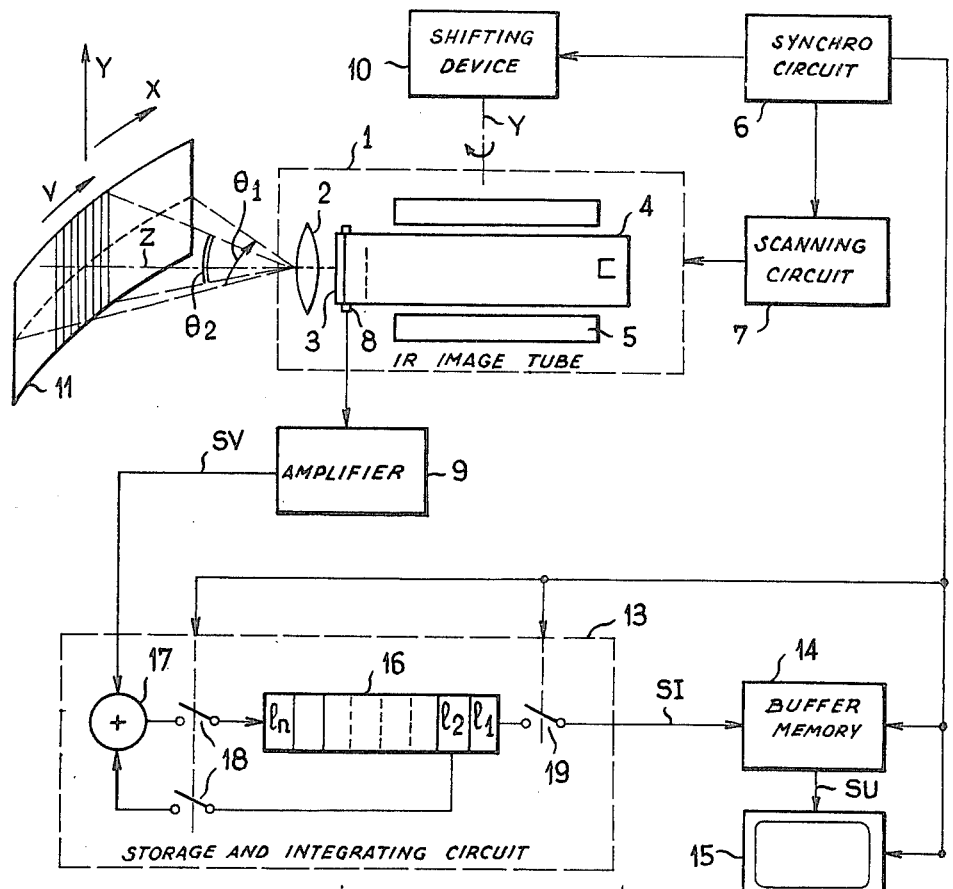

United States Patent [19]

Dansac et al.

[11] 4,191,967

[45] Mar. 4, 1980

[54] INFRARED IMAGING DEVICE USING A PYROELECTRIC IMAGE TUBE

[75] Inventors: Jean Dansac; Christian Pepin; Henri Cammas, all of Paris, France

[73] Assignee: Thomson-CSF, Paris, France

[21] Appl. No.: 867,408

[22] Filed: Jan. 6, 1978

[30] Foreign Application Priority Data

Jan. 21, 1977 [FR] France ............................ 77 01741

[51] Int. Cl.² ............................................. H04N 3/16
[52] U.S. Cl. ................................... 358/113; 358/108; 358/210; 358/225
[58] Field of Search ............... 358/93, 113, 125, 105, 358/108, 126, 166, 222, 210, 109; 250/333, 334

[56] References Cited

U.S. PATENT DOCUMENTS

| | | | |
|---|---|---|---|
| 3,078,340 | 2/1963 | Willey | 358/109 |
| 3,723,642 | 3/1973 | Laakmann | 358/167 |
| 4,040,087 | 8/1977 | Hall | 358/113 |
| 4,054,797 | 10/1977 | Milton et al. | 250/334 |

Primary Examiner—Robert L. Griffin
Assistant Examiner—Joseph A. Orsino, Jr.
Attorney, Agent, or Firm—Edwin E. Greigg

[57] ABSTRACT

An infrared imaging device enabling operation in the panning mode with a very high sensitivity and the facility of viewing a desired part of the observed field. A pyroelectric imaging tube is shifted relative to the observed scene and the infrared image on the target is read in a line by line scan the direction of the line being perpendicular to that in which the image is shifted. The shift takes place at a speed corresponding to a whole number R of line intervals in the course of one image frame scan comprising $n = KR$ lines, with the result that each point is examined K times in the course of K successive frame periods; the video signal is accordingly processed to perform K successive integrations.

7 Claims, 9 Drawing Figures

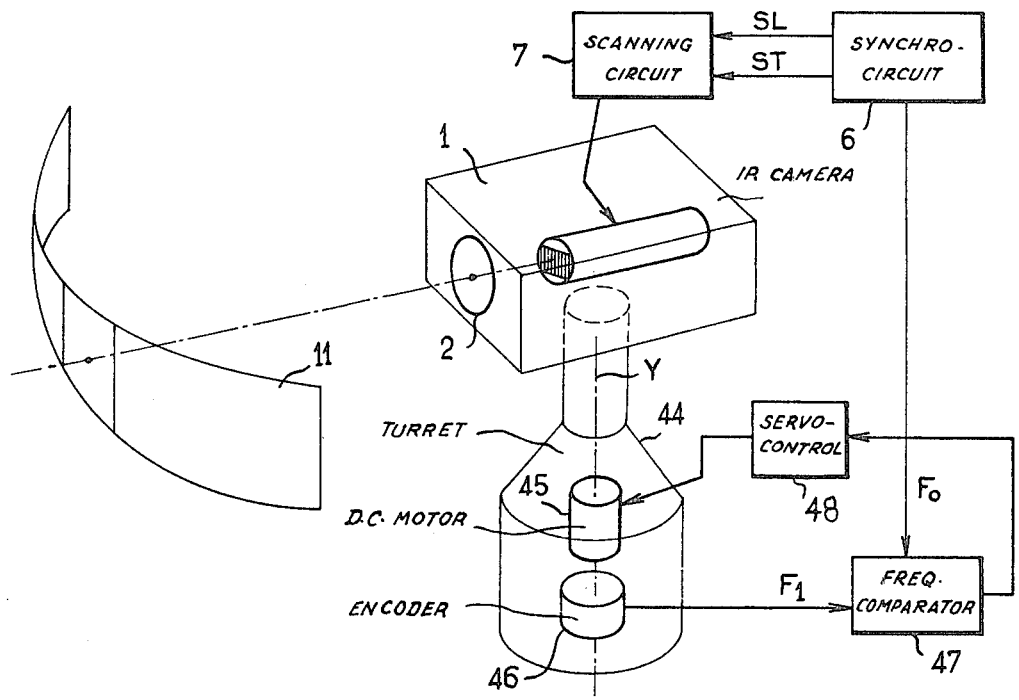
FIG_9

INFRARED IMAGING DEVICE USING A PYROELECTRIC IMAGE TUBE

The present invention relates to an infrared imaging device utilizing a thermal image tube having a pyroelectric target.

Pyroelectric imaging tubes are sensitive to infrared radiation. In known designs one side of the pyroelectric target is scanned by a beam of electrons and the other is in contact with a signal electrode. The tube is similar in appearance to a vidicon but it differs mainly in having an entry window which is transparent to infrared radiation and a target which is formed by a thin sheet of a pyroelectric material.

In a direction normal to its surface, the permanent bias of the target varies with temperature by virtue of the pyroelectric effect. When an image is projected through the entry window, the incident energy is absorbed in the target and causes local variations in temperature. This results in a spatial distribution of the surface charges. These charges are compensated by the beam of scanning electrons and this produces the video signal by coupling with the signal electrode.

At each point on the target, the scanning by the beam enables the change in temperature between two successive frames to be detected. Consequently, a stationary object at constant temperature can no longer be detected when the target has reached thermal equilibrium. To obtain a signal under these circumstances, it is necessary either to interrupt the flow of infrared radiation by means of an obturator or to move the image of the object continuously on the target, which may be achieved by altering the line of sight of the camera. These modes of operation, which are termed the chopping and panning modes, have different characteristics.

The field which the optical entry system associated with the tube allows to be observed at any given time is usually fairly restricted, being of the order of 9° for example. Consequently, to inspect a given area covering a wider field it is necessary for the image to be traversed using the panning mode. The chopping mode on the other hand allows a fixed area, although one of smaller size, to be observed. From the point of view of performance, the panning mode represents a better compromise between the parameters of resolution, i.e. separating, power, and sensitivity, whereas the chopping mode offers good resolution but rather limited sensitivity.

One object of the invention is to provide an infrared pick-up arrangement which operates in the panning mode and which provides very high sensitivity while still retaining its characteristics of resolution.

Another object of the invention is to enable a zone of adjustable width to be viewed which corresponds to a desired part of the observed field and which may, in the extreme case, constitute the whole of this field.

As will subsequently become apparent from the description, the imaging device thus shares features of both the above-mentioned modes in that it enables a wide field or a fixed area representing a partial field to be viewed. In addition the angular size of the partial field which is viewed can be set as desired as also can the length of viewing time.

In accordance with a feature of the invention, the infrared imaging device comprises: shifting means for shifting the viewing axis of the tube relative to an observed scene to carry out a panning surveillance, reading means for scanning line by line the infrared image formed on the target of the tube to provide a corresponding video signal, and processing means for processing the video signal with a view to a display of the television type, the said shifting means and reading means being so designed that the direction of the lines is perpendicular to the shifting direction of the axis and in that the speed of the shift is lower than that of the frame scan to cover a predetermined whole number R of line intervals such that $1 \leq R \leq n/2$, in the course of one frame period which comprises n, lines and in that the processing means comprise storage and integrating circuit to sum the video signal with the previously stored signal corresponding to the same point in the observed scene and thus to obtain a video signal integrated $K = n/R$ times for each point after K successive frame periods, and a buffer memory device to store the said integrated video signal and to provide the intended display signal.

Figure 2:
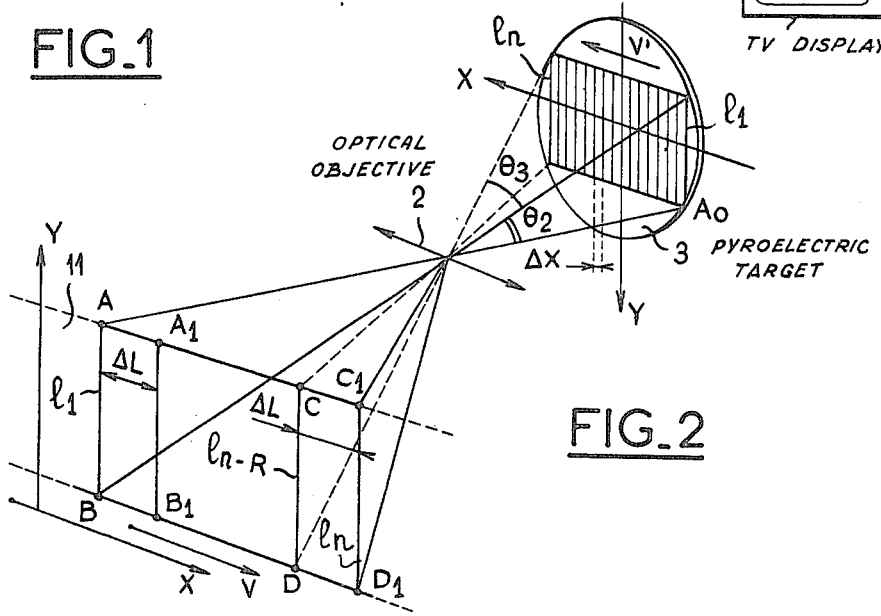
Figure 3:
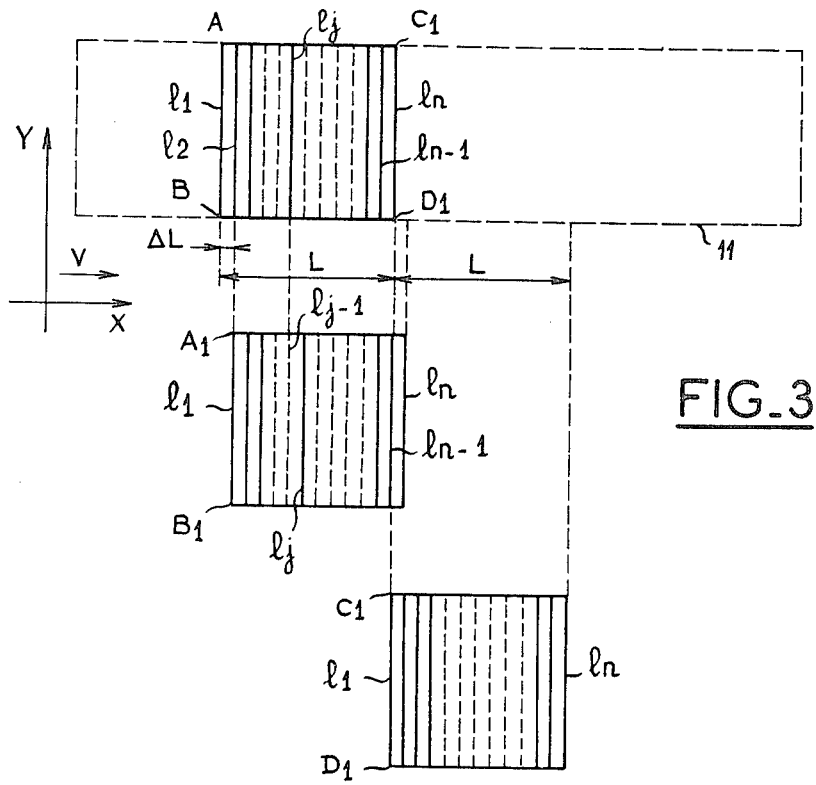
Figure 4:
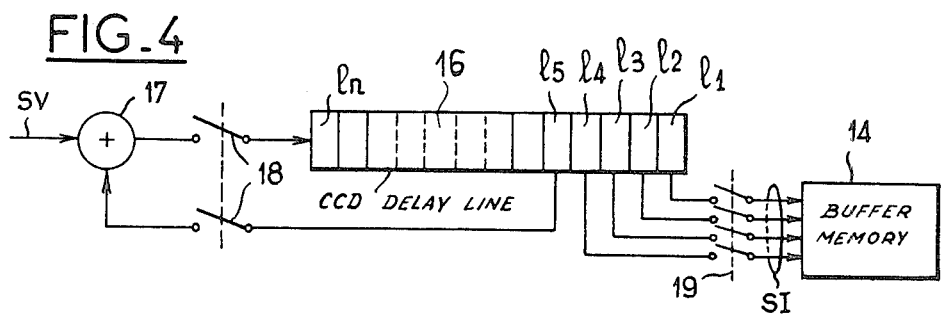
Figure 5:
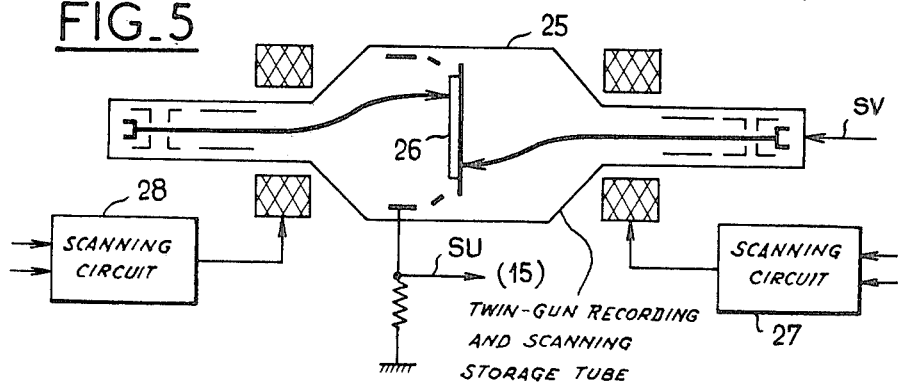
Figure 6:
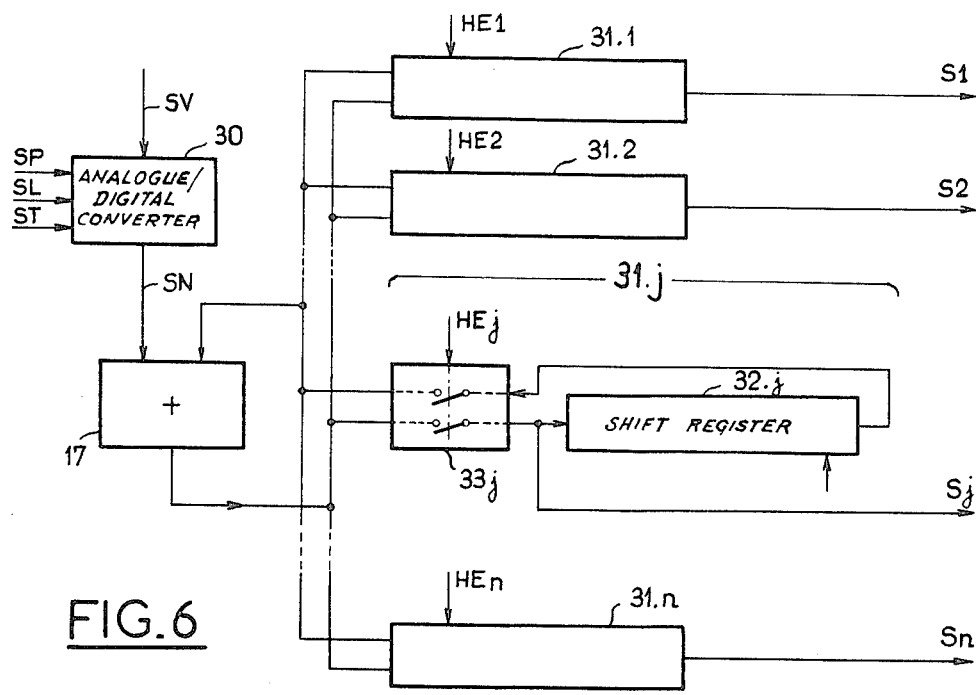
Figure 7:
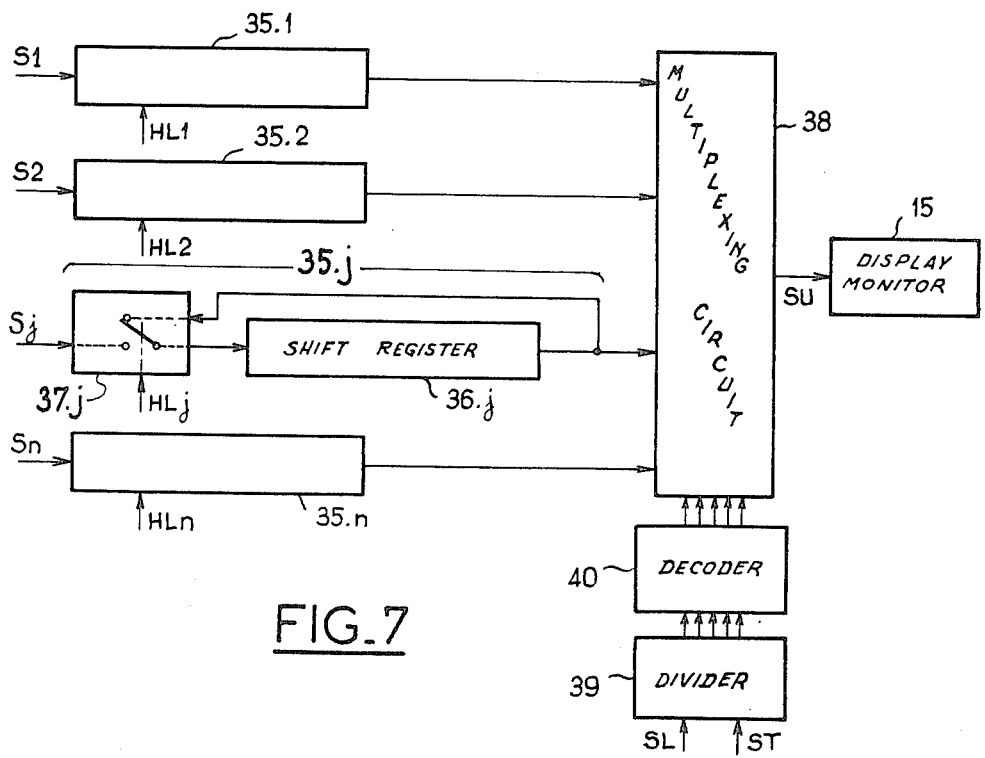
Figure 8:
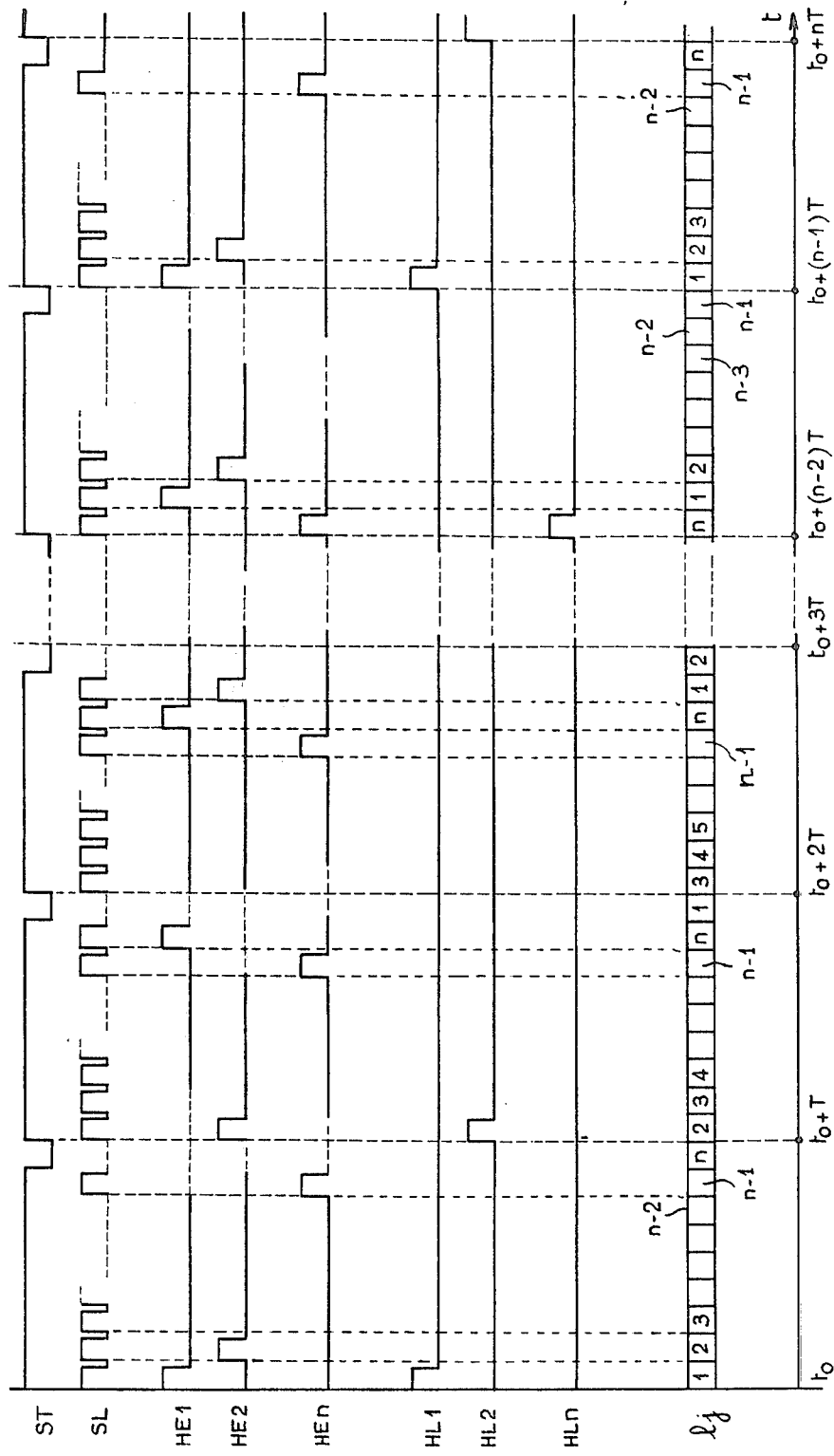

The invention will now be further described with reference to the accompanying drawings, which show:

FIG. 1, a general diagram of an infrared imaging device according to the invention, FIG. 2, a diagram of a detail of the device shown in FIG. 1, FIG. 3, a diagram relating to the scanning process used, FIG. 4, a diagram of part of the device of FIG. 1, relating to the general design of the memory and integrating circuits, FIG. 5, an embodiment of the circuits of FIG. 4 which employ a storage tube, FIGS. 6 and 7, a second embodiment of the circuits of FIG. 4 which employ digital circuits, FIG. 8, waveforms relating to the operation of the device according to FIGS. 6 and 7, and FIG. 9, an embodiment of drive means for panning in rotation.

The infrared imaging device shown in FIG. 1 comprises a tube 1 consisting chiefly of a focussing objective 2, a pyroelectric target 3 at one end of an electron gun 4, and focussing and scanning coils 5. The operation of the tube is similar to that of a vidicon, bearing in mind that the light flux received at the target lies in the infrared range. In the panning mode which is used, the viewing axis Z or optical axis of the tube is shifted at a speed V in a direction X and the traverse of the image across the target takes place at this speed in this direction, as shown in the partial diagram of FIG. 2. The direction X is considered horizontal to allow a panning surveillance to be carried out in azimuth. The scan is of the line by line kind as in television and is performed in such a way that the lines are orientated in a direction Y which is perpendicular to that X in which the image is shifted across the target, the frame scan taking place in the direction X of this shift. A synchronising circuit 6 produces a line synchronising signal SL and a frame synchronising signal ST to control a scanning circuit 7 which emits the deflection signals required for the scan.

The video signal is derived from an electrode 8 of the tube at the target end and is applied to circuits 9 consisting chiefly of simplifying circuits to produce a usable video signal SV. The circuits 1 to 9 may be grouped together in a pick-up camera.

The traverse of the image across the target is produced by shifting the viewing axis Z of the camera relative to the observed scene. This may be achieved in various ways depending on the kind of application in mind. It may be that the observed scene is moving and the camera can then be fixed. On the other hand the camera may be mobile, being for example mounted on an aircraft for the purpose of ground surveillance, and thus moves relative to the scene, which is fixed. In the most common case, the camera is set up at a fixed point and has to be made movable about an axis so as to carry out a panning surveillance of a fixed scene. In each of the cases mentioned, the change of temperature is produced by a relative movement between the camera and the surroundings and they therefore all represent the same kind of operation in fact. In the last case mentioned, the means for movement are not external to the camera but are built in, as shown at 10 in the Figure, to produce rotation about an axis Y. What is understood by "fixed point" is an installation in a fixed position on the ground or in a semi-fixed position, such as on a vehicle or a ship, it being possible to ignore the speed of movement of the carrier when compared with the speed at which the observed area is examined and the carrier may be thought of as in a fixed position. The means 10 for shifting the viewing axis Z relative to the fixed scene are synchronised by circuit 6 in such a way that, in particular, a preferably constant predetermined value V is established for the speed of traverse of the image. The viewing scan takes place cyclically for example over a horizontal sector of angular size $\theta_1$ which defines, in conjunction with the angle $\theta_2$ of the useful instantaneous field represented by the angle covered in direction Y by an image, a total viewing area which is shown as an arcuate band in FIG. 1.

In FIG. 2 is shown the rectangular area of the target 3 which is used for scanning to form the video signals intended for display. The total area of the target is larger and is generally circular as shown. Selecting means employing a mechanical mask and signals are used in a known fashion to extract the signals resulting from the scanning of the useful rectangular area. Corresponding to this useful area is an instantaneous useful field which defines a zone ABCD in an object plane 11 at the starting time $t_0$ concerned. The corresponding image is scanned line by line. It contains n lines l1 to ln, the time T taken to scan the n lines making up one image corresponding to the frame period. The speed V of traverse of the image is assumed to be in the same direction as that of the frame scan from one line to the next in direction X. If $t_0$ is the starting time of an image scan, at this time the scan is situated at AO, which is the image of point A. Point AO forms the starting point for the first line l1, which corresponds AB in the object plane. At the end $t_0$T of the image scan, line CD has reached C1D1 as a result of the swing of the optical axis, which has given rise to a shift L=CC1=DD1=VT. The $n^{th}$ line scanned corresponds to points C1 to D1 in the object plane.

In accordance with the invention, the means for relative shifting are so designed that the distance in direction X at the image plane of the target which corresponds to the movement ΔL through space is equal to a whole number R of line intervals, such that R·ΔX=V'T, V' being the speed of shift V when transposed to the plane of the target of the tube, R being the number of intervals and ΔX being the size of an interval separating two lines. The number R may be made at least equal to 1 and is capable of assuming any whole number value greater than 1 which is a sub-multiple of n up to a maximum value of n/2 if n is even, n/2 corresponding to half the width of the image in direction X, this maximum value becoming n/3 if n is odd.

To make the operation easier to understand, the parameter R will be assumed to be equal to 1, which also results in the design of the highest performance, as will become apparent below.

In FIG. 3, the points examined, which correspond to the scan lines, have been transposed to the object plane 11, as also have the points scanned in the course of the next frame as well as those in the $n^{th}$ subsequent frame, these sets of points being shown one below the other with the appropriate displacements in direction X. Given the displacement which is assumed, line l1 of the second frame corresponds to line l2 of the first frame shown and the points corresponding to any line lj are situated and are examined, in the course of the next frame period, on line lj−1. In this way each point is examined n times in the course of n successive scans, the time taken for the image of this point to travel right across the target in direction X being n·T to cross all the lines l1 to ln.

For a displacement by a number of intervals R greater than 1, R being a whole number of the form n/K, each point is looked at K times in the course of K successive scans. By way of example, if the scan covers 200 lines, with R=1 each point is examined 200 times and with R=100 each point is examined twice.

The property which has been brought out with reference to FIGS. 2 and 3 of being able to examine each point in the observed scene a plurality of times providing there is a predetermined regulation of the speed laid down for the relative movement between target and object, is exploited by providing the infrared imaging device according to the invention with means for memorising and integrating the detected video signal. These means are represented by block 13 in FIG. 1. Their function is to store the video signal SV resulting from one image scan line by line, and point by point in each line, and then to derive this stored signal in the course of the next scan and add it to the incoming signal SV while allowing for the displacement between the lines caused by the speed of traverse V, so that the items of information relating to the same point in the image plane are summed each time, and so that the result of the addition is returned to store so that it can be resummed under the same conditions with the video signal SV in the course of the next scan, the operation being repeated K times in succession for each line. At the end of each image scan the memory contains R lines available for display. In view of the fact that the complete number of lines n in a zone ABC1D1 in the object plane will only be available after a time KT, the available integrated signal SI is preferably stored in an intermediate buffer memory 14 being it goes to an ancillary display device 15. The buffer memory 14 is of the matrix type and is designed to store the signal SI line by line and point by point in each line. Its capacity may be calculated in such a way as to enable it to store the same number n of lines as are covered by the scan of the target. In this way the image displayed corresponds to the area of space ABC1D1 covered by the camera in the course of one frame scan. The capacity of the memory 14 may also be made of some other size than this value and may in particular be made larger, so that a larger field can be displayed which, in the extreme case, may be formed by the whole of the scene which is examined in the course of the panning shift. In addition, the fact of having available an intermediate buffer memory enables a fraction of the stored information to be extracted at will, providing the memory is suitably addressed for read-out, to allow a part zone to be displayed and viewed for some desired period, which zone may in particular be smaller or larger than that corresponding to the image on the target.

The principle of operation of the memory and integrating means 13 is indicated diagrammatically in FIG. 1 by a memory 16, such as an analogue delay line whose total delay corresponds to the n lines of one target scan, and by an adding circuit 17. The line 16 has an intermediate tapping to feed the circuit 17 under the circumstances dictated by the displacement between lines, that is to say that in the example shown in the drawings where R=1, the points in line lj+1 are summed with the points in line lj of the current scan. The transfers of signals are controlled by the synchronising circuit 6, which controls appropriate means represented by switching circuits 18 and 19. FIG. 4 shows a corresponding layout for a value of R greater than 1, meaning that the number R of lines available at each scan becomes greater. The case shown corresponds to R=4.

The choice of the parameter R determines the fraction of the image which is available in the course of each scan, the corresponding number of integrations being given by K=n/R. The fact of integrating K times any image point whatever from the observed scene during its passage across the target endows the arrangement with a considerably improved signal to noise ratio. At each frame of examination, the image is stored in the memory 13 and added up point by point with the image stored at the time of the previous frame whilst allowing for the number of lines of displacement between the two successive frames, this displacement corresponding to the traverse of the image across the target during one frame period.

By way of example, if the tube is examined with n=200 useful lines per target diameter at a frame period T of 20 ms and with a speed of traverse V across the target=0.4 cm/s, the image of a fixed point in the scene crosses the target in direction X in four seconds, which is equivalent to the examination of 200 frames. At each frame it is necessary for the stored image to be shifted by one line before performing the integration in the memory, which may contain 201 lines if a matrix memory is assumed.

The memorising means 13 are arranged to perform the post-integration mentioned and the integrated data may be extracted to produce a direct display or may be transferred to another memory to produce a complete display of the whole of the scene 11 surveyed, thus avoiding a shifting image on the display screen.

The rate of renewal of information depends, as in radar, on the total observed field and on the desired range. For example, with a focal length of 100 mm and an instantaneous field for the camera of 9°, the panning surveillance of a zone of ±30° requires a period of the order of 20 seconds.

So that the integration may be conveniently performed and so that there is no loss of resolution, it is necessary that the panning movement of the camera takes place in strict synchronisation with the examination in the tube.

It has been assumed that the direction of traverse of the image is the same as that of the scan in direction X. If these directions are imagined to be reversed, then line l1 will correspond to CD and line ln to A1B1 in the view shown in FIG. 1, whilst at the time of the next scan line l1 will correspond to C1D1 and the available signals will correspond to the R lines ln−(R−1) to ln.

There are various possible ways of producing the imaging device. The functions performed by the combination 13, 14 may for example be performed by a twin-gun recording and scanning storage tube 25 as shown in the diagram of FIG. 5. The signal SV is applied to the writing gun and scanning the target 26 produces a useful signal SU intended for display. The circuits 27 and 28 represent circuits for generating scan signals in such a way that at the time of writing allowance is made for the displacement R from one frame to the next and at read-out a desired fraction or the whole of the integrated image stored by the target 26 can be selected. The circuit 27 is synchronised from the synchronising circuit 6. Circuit 28 is synchronised line by line under the same conditions as the ancillary display device 15, which synchronisation may also be performed from circuit 6.

In other embodiments memories are used to store the signal in analogue or digital form. In the context of an embodiment in which the signal is processed in analogue form, the memory means 16 may be produced by using charge coupled devices or CCD's. In what follows a description is given, with reference to FIGS. 6 to 8, of a preferred embodiment where the signal is processed digitally and where, for reasons of simplicity, the parameter R is assumed to be equal to 1 and the capacity of the buffer memory 14 equal to that required to store the n lines in an image. In addition, to satisfy the same desire for clarity, the signal is considered from the point of view of a line rather than a point, which is represented after conversion by a word containing a predetermined number of bits.

FIG. 6 shows memory and integrating circuits corresponding to block 13 of FIG. 1. The video signal SV is first applied to an analogue/digital converting circuit 30 which is controlled by frame ST, line SL and point SP synchronising signals coming from circuit 6 and which emits a digital signal SN which depends on the conditions preset for the conversion. For example, each image point may be converted into a binary word of four bits to allow sixteen quantitied amplitude levels of the signal to be identified. The memory contains n circuits 31.1 to 31.n which are respectively synchronised by write clock signals HE1 to HEn (FIG. 8) produced by the synchronising circuit 6. Each of the circuits 31, such as the circuit 31.j which is shown in detail, contains a shift register circuit 32.j and a switching circuit 33.j which is controlled by the corresponding signal HEj. Each register has a capacity appropriate to the m points in a scan line and the sets of data corresponding to lines l1 to ln are stored by the successive closures of switches 33.1 to 33.n respectively during the period of the appropriate line in the image scan which takes place from $t_0$ to $t_0+T$ (FIG. 8). In the course of the next scan from $t_0+T$ to $t_0+2T$, the signals HE1 to HEn are displaced so that each line lj is added at 17 to line lj−1 of the target scan in order to allow for the displacement R. The result of the digital summation which is performed point by point at 17 is returned to the appropriate register 32 via the associated switching circuit 33. The registers 32 are controlled by the synchronisation so that the addition takes place point by point and in correspondance in circuit 17. In the course of the next frame period a new displacement of the signals HE enables the content lj to be added to the line lj−2 being scanned and so on until the $n^{th}$ scan from $t_0+(n-1)T$ to $t_0+nT$. The output signals S1 to Sn form the integrated signals, one line becoming available at each scan period. The signals may be extracted from the memory re-write connection as shown for channel j, provided that the register 32j is reset to zero during the frame blanking interval during which the scan flyback occurs. In the course of the first frame, signal S1 is extracted, then signal S2 in the course of the second frame and so on. After the $n^{th}$ frame the extracted signal has undergone n successive integrations. Thus, at the $n+1^{th}$ frame, signal S1 will have been integrated n times between time $to+T$ and $to+(n+1)T$, and so on.

FIG. 7 shows an embodiment of the buffer memory section (14, FIG. 1) which has n input circuits 35.1 to 35.n which are fed from respective ones of the outputs S1 to Sn. As indicated in the case of the channel j which is shown in detail, each channel contains a shift register 36.j similar to the above mentioned register 32.j and a switching circuit 37.J which is controlled by a read-out clock signal HLj. The synchronising signals HL1 to HLn (FIG. 8) are also assumed to be produced by the synchronising assembly 6. The circuits 37 enable the signals S1 to Sn to be extracted in succession as described above. In addition, when in the rest position which is shown, they provide for re-write into the corresponding memory 36.j when the signal lj is extracted for display purposes. The extraction of the useful signal SU takes place by means of a multiplexing circuit 38 and addressing circuits which may comprise a divider circuit 39 and a decoding circuit 40. On the basis of signals SL, ST, the divider circuit 39 produces pulses corresponding to the various scan lines and the decoding circuit 40 produces addressing signals to extract the signals S1 to Sn stored in registers 36.1 to 36.n in succession. Member 39 may form part of the synchronising assembly 6, the pulses for the timed selection of the lines being used to form the write signals HE1 to HEn and the read signals HL1 to HLn.

Each point in the image, after conversion at 30, forms a binary word of p bits. The circuits involved in the embodiments shown in FIGS. 6 and 7 are accordingly designed to handle words containing an adequate number r of bits which is greater than p because they result from K successive summations at 17. The registers 32, 36 are of the r bit kind with m stages, m being the number of points per line. Such logic circuits are known per se, as also are circuits for parallel and series transfer, addition, etc., and the arrangement of these circuits in the embodiment described is based on known techniques. Similarly, it is assumed that known techniques and simple logic circuits which operate by division, addition, subtraction, counting, etc., are relied on to produce the various synchronising signals and in particular the signals HE and HL, and that the manner of producing the synchronising assembly 6 is outside the scope of the invention.

To bring about the synchronous shift, the means 10 (FIG. 1) may consist of a synchronous motor which receives from the synchronising assembly 6 a supply signal whose frequency is so calculated that the rotation of the motor shaft, possibly via a reduction device, drives a turret supporting the camera at a constant desired angular speed V. In such a design, the signal supplying the motor and those for synchronising the scan are produced from the same basic clock signal. In this way the displacement R remains unvarying if the frequency of the basic clock signal shows instability.

Another possible embodiment is shown in FIG. 9. A DC motor 45 drives a turret 44 about the axis Y an about an encoding device 46 mounted on the same axis. The encoder may be of the type which employs an optical track for example to give a signal whose frequency F1 is directly related to the speed of rotation. This signal is compared in a comparison circuit 47 with a signal produced by a unit 6 which is of a reference frequency Fo. The result of the comparison forms an error signal which, via a circuit 48, is used to servocontrol the speed of rotation of the motor as a function of the difference between the frequencies F1 and Fo and to maintain the speed at the desired value V.

The shifting means have been given as an example and may be produced in various other ways, their function being to create relative motion between the observed scene and the scanned target such that predetermined conditions of synchronisation are observed between the velocity this motion and that of the image scan in the same direction Y so as to produce a desired displacement R at each image scan and to allow each point scanned to be integrated n/R times.

It will be seen from the description which has been given that the infrared imaging device provides a considerably improved sensitivity and has other advantages which derive chiefly from the facility for observing a partial zone whose size can be set at will, as also can the period of observation.

What is claimed is:

1. An infrared imaging device utilizing a pyroelectric image tube and comprising: shifting means for shifting the viewing axis of the tube relative to an observed scene to carry out a panning surveillance, reading means for scanning line by line the infrared image formed on the target of the tube to provide a corresponding video signal, and processing means for processing the video signal for use in a line scan television display, the said shifting means and reading means being so designed that the direction of the lines is perpendicular to the shifting direction of the axis and in that the speed of the shift is lower than that of the frame scan to cover a distance of a predetermined whole number R of line intervals such that $1 \leq R \leq n/2$, in the course of one frame period which comprises n lines and in that the processing means comprise storage and integrating circuits for storing the video signal of an image scan, line by line and point by point in each line after being added to the video signal stored in the course of the preceding image scan and which signal corresponds to the same point in the observed scene and thus to obtain a video signal integrated $K=n/R$ times for each point after K successive frame periods, and a buffer memory device to store the said integrated video signal and to provide the intended display signal.

2. An imaging device according to claim 1, in which the reading means comprise a synchronising circuit to produce the line and frame synchronising signals and a scanning circuit synchronised by these synchronised signals to produce the corresponding deflection signals for a line by line scan, and wherein the shifting means are synchronised from the said synchronising circuit to provide the said panning shift synchronous with the scanning of the tube, such that the traverse of the image across the target corresponds to said R line intervals in each frame period.

3. An imaging device according to claim 2 wherein the said buffer memory device includes transfer means for transfering at the frame rate the R lines available from the said memory means to a buffer memory at the end of each frame scan.

4. An imaging device according to claim 3, wherein the said buffer memory has a capacity at least equal to the number n of lines in an image and at most equal to the capacity required to store the whole of the scene which is viewed in the course of the said panning shift.

5. An imaging device according to claim 4, wherein the buffer memory device includes reading means to extract the display signal intended for an ancillary display device line by line, to allow a part of the stored image to be displayed.

6. An imaging device according to claim 2, wherein the storage and integrating circuits and the buffer memory device are in the form of a twin-gun recording and scanning storage tube with associated scan circuits.

7. An imaging device according to claim 2, wherein the storage means are in the form of analogue delay lines produced from charge coupled circuits.

* * * * *